United States Patent [19]
Ogihara

[11] Patent Number: 6,005,223
[45] Date of Patent: Dec. 21, 1999

[54] PREFORM HEATING DEVICE

[75] Inventor: Shuichi Ogihara, Komoro, Japan

[73] Assignee: Nissei ASB Machine Co., Ltd., Nagano-ken, Japan

[21] Appl. No.: 09/066,073

[22] Filed: Apr. 24, 1998

[30] Foreign Application Priority Data

Mar. 13, 1998 [JP] Japan .................................. 10-082971

[51] Int. Cl.⁶ ............................... F27B 9/32; F27B 9/36; B29C 49/68
[52] U.S. Cl. ........................... 219/388; 219/404; 264/535
[58] Field of Search ................................... 219/388, 402, 219/404, 408, 411; 425/DIG. 13, 526; 432/11, 121, 124, 147; 34/104, 105; 264/526, 535

[56] References Cited

U.S. PATENT DOCUMENTS

| | | | |
|---|---|---|---|
| 2,036,183 | 5/1936 | Anderson | 219/404 |
| 3,283,046 | 11/1966 | de Witt et al. | 264/526 |
| 3,523,181 | 8/1970 | Beasley | 219/404 |
| 4,147,487 | 4/1979 | Dickson et al. | 425/526 |
| 4,204,111 | 5/1980 | Yonko | 219/411 |
| 4,409,455 | 10/1983 | Belcher et al. | 264/454 |
| 4,606,723 | 8/1986 | Pasternicki | 219/388 |
| 4,923,395 | 5/1990 | Coxhead et al. | 432/147 |
| 5,180,893 | 1/1993 | Sugiyama et al. | 425/526 |
| 5,688,466 | 11/1997 | Mitchell et al. | 264/535 |
| 5,780,069 | 7/1998 | Suzuki | 425/526 |
| 5,793,023 | 8/1998 | Hong et al. | 219/404 |

*Primary Examiner*—Joseph Pelham
*Attorney, Agent, or Firm*—David L. Hoffman, Esq.; Cislo & Thomas LLP

[57] ABSTRACT

A preform heating device has a plurality of infrared heaters disposed horizontally and spaced apart in the axial direction of a preform carried along a carrying path which carries a preform in a state that the axial direction thereof is vertical. The preform is at least rotated when facing the infrared heaters. First and second insulating plates, and an insulating air layer formed therebetween are disposed facing the carrying path with the infrared heaters between. The infrared heaters are supported by a plurality of support members. Each of this plurality of support members is able to be moved upward and downward by a height adjustment means, and is fixed to the second insulating plate at a given vertical position.

13 Claims, 4 Drawing Sheets

PREFORM HEATING DEVICE

BACKGROUND OF THE INVENTION

1. Field of the Invention

The present invention relates to a preform heating device used in a blow molding device in which a preform formed by injection molding or extrusion molding is heated and subsequently blow molded, and in particular to a preform heating device having a plurality of infrared heaters spaced apart in the axial direction of the preform.

2. Prior Art

A preform heating device having a plurality of infrared heaters spaced apart in the axial direction of the preform is described for example in U.S. Pat. No. Re. 34,177 and U.S. Pat. No. 5,549,468.

In U.S. Pat. No. Re. 34,177, an adjustment means is provided whereby during the forming process, an operator can adjust the heater positioning from the exterior of the device to move the heaters closer to or further away from the preforms.

In U.S. Pat. No. 5,549,468, as in U.S. Pat. No. Re. 34,177, the problem is discussed that if the operator is able to adjust the heater positioning in an arbitrary way, accurate repetition under the same conditions is not possible, and it is proposed that the heating box be removed, and the heaters adjusted to accurate positioning using a separately provided adjustment jig.

Furthermore, in U.S. Pat. No. 5,549,468, it is proposed that in addition to the horizontal heater positioning adjustment, the heater positioning be adjustable in the vertical direction.

In Japanese Patent Application Laid-Open No. 8-132517, a previous proposal by the applicant of the present application, a blow molding device for small-scale manufacture is disclosed. In this blow molding device, a heating box is adjustable on a base in the vertical direction and also towards and away from the preforms, and further, within the heating box a pair of heaters is adjustable in the vertical direction and also towards and away from the preforms with respect to a rod extending vertically within the heating box.

However, the adjustment of the heater positioning within the heating box of a blow molding device is carried out infrequently, and generally in a fabrication plant a single blow molding device is often used for several years to make the same bottle or other product, and even when there are limited design changes in a bottle the adjustment can be achieved by adjustment of the heater voltage.

For this reason, the task of adjusting the heater positioning is only required when the device is originally set up for blow molding, and when there is a change to a completely new preform, bottle, or other molded product from previously.

Therefore, a construction as disclosed in U.S. Pat. No. Re. 34,177, in which the operator frequently adjusts the positioning of the heaters during the forming process is undesirable.

Further, as described in U.S. Pat. No. 5,549,468, the onerous task of removing the heating box in order to adjust the heater positioning, and the requirement to provide a special jig for the sole purpose of adjustment is a burden on the operator.

Furthermore, for a blow molding device for small-scale manufacture as disclosed in Japanese Patent Application Laid-Open No. 8-132517, compared with conventional devices for large-scale manufacture, replacement of a mold for different molded products has become more common.

Thus, when adjusting the molding conditions, the heater adjustment is more frequently required for positioning adjustment in the vertical direction than in the positioning closer to or further away from the preforms, and therefore an improvement in the ease of carrying out heater positioning adjustment is desirable.

SUMMARY OF THE INVENTION

The object of the present invention is the provision of a preform heating device in which work can be carried out without requiring an onerous task such as the removal of a heating box, and moreover without influence from the heat emitted by heaters, the heater height can be adjusted.

Another object of the invention is the provision of a preform heating device such that with a simple construction the heater arrangement can be easily adjusted.

A further object of the invention is the provision of a preform heating device such that during the adjustment of heater positioning, the heaters are protected from damage.

A preform heating device of the present invention comprises:

a carrying path along which a preform is carried in a state that an axial direction thereof is vertical;

infrared heaters disposed horizontally and spaced apart in the axial direction of the preform carried along the carrying path;

a rotating means for rotating the preform;

a first insulating plate disposed vertically, the first insulating plate and the carrying path being disposed facing each other with the infrared heaters between;

a second insulating plate disposed more remotely from the infrared heaters than the first insulating plate;

an insulating air layer formed between the first and second insulating plates;

support members for supporting each of the infrared heaters; and a height adjustment means for allowing the height of the support members to be moved in the vertical direction with respect to the second insulating plate, and fixing the support members to the second insulating plate in a given vertical position.

By means of the insulating air layer formed between the first and second insulating plates, the height adjustment means is prevented from being excessively heated, and therefore after the voltage supply to the plurality of infrared heaters is turned off, the operation of adjusting the plurality of infrared heaters can be carried out promptly.

Further, by the provision of this insulating air layer, excessive heating of terminal boards and the like can also be prevented, and durability can be improved.

Furthermore, since the height adjustment means is provided on the opposite side from the preform carrying path, the operation of adjustment by the operator is easy, and there is no necessity for an onerous task such as the removal of a complete heating device.

Preferably, the upper and lateral sides of the first and second insulating plates and the height adjustment means excluding the lateral side facing the carrying path are covered by a heating box cover. This is for safety reasons, to prevent burns.

Here, the height adjustment means preferably comprises a first vertical slot formed in the second insulating plate and handles projecting from the support members through the first vertical slot. By vertically manipulating the handles in the first vertical slot in a space insulated by the insulating air layer and so forth, the height of each of the infrared heaters can easily be adjusted. Moreover, since the vertical adjustment of the infrared heaters is carried out using the vertical slot, with a simple construction the position can be visually checked.

Preferably, between the heating box cover and the second insulating plate is provided a manipulation space for a manipulation of the handles in the vertical direction. The reason for this is that the handles can be manipulated simply by removing the heating box cover.

Further, the height adjustment means preferably comprises a second vertical slot formed in the second insulating plate, and fastening means for fastening the support members to the second insulating plate through the second vertical slot. The reason for this is that simply by manipulating the fastening means in a space insulated by the insulating air layer and so forth, the support members can be fixed to the second insulating plate at a given vertical position.

In this case again, between the heating box cover and the second insulating plate is preferably provided a manipulation space for a manipulation of the fastening means.

Each of the support members preferably comprises:
  a first support member disposed between the first and second insulating plates; and
  a pair of second support members projecting from each end of the first support members toward the carrying path, and mounting both ends of each of the infrared heaters on projecting extremities thereof.

By the infrared heaters being supported across both ends of the support members, while adjusting the infrared heater positioning, without directly moving the infrared heaters, the infrared heaters can be moved by means of the support members. For this reason, the direct application of a force to the easily breakable infrared heaters can be avoided.

Moreover, since the infrared heaters are only mounted on the support members at both ends, no excessive forces are applied to the ends of the infrared heaters, and damage to the infrared heaters can even more so be prevented.

Preferably, each of the pair of second support members has fixing holes formed spaced apart in the horizontal direction. By means of a simple construction in which one of the fixing holes is selected to attach the pair of second support members to the first support member, the respective distances between the preform and the infrared heaters can be adjusted. Moreover, from the position of the selected fixing hole, the horizontal position of the infrared heater can easily be seen.

Preferably, each of the pair of second support members has an engaging groove engaging with each end of the first support members, and the engaging groove is formed to extend over the range of formation of the fixing holes. Since the extremities of the first support members are constantly engaged with a engaging groove of the pair of second support members, even while the fixing hole is changed during the positioning adjustment process, a pair of the second support members are prevented from falling from the first support members. Furthermore, since the engaged state of the first and second support members is maintained, the pair of second support members is not easily moved, an a movement of the infrared heaters excessively close to the preforms can be prevented. By this means, damage to the infrared heaters can be greatly reduced.

Between the extremities of the pair of second support members is preferably attached a reflector for reflecting light from each of the infrared heaters toward the preform.

The reason for this is that even if the infrared heater is moved, the relative positions of the infrared heater and reflector are constant. Moreover, even if the first support member and pair of second support members are released from the state of being fixed together, since the pair of second support members is connected to the reflector, the application of unnecessary force directly to the infrared heater can be prevented. By this means, damage to the infrared heaters can be prevented.

The reflector is preferably formed so as to project closer to the preform than each of the infrared heaters. By this means, if the infrared heater should by any chance be brought close to the preforms, the reflector will contact the preforms earlier than the infrared heater. As a result, the application of an excessive force to the infrared heater can be prevented, and damage thereof can be prevented.

Preferably, a compressed air supply means for supplying compressed air toward between the first and second insulating plates is further provided. In this case each of the first support members preferably has a through hole allowing the compressed air to pass.

Compressed air from a compressed air supply means cools between the first and second insulating plates. The air can be positively supplied between the first and second insulating plates by means of the through holes formed in the first insulating plate. By this means, a continuous rise in temperature due to accumulated heat is prevented, and the molding environment can be stabilized.

Preferably, the preform heating device further comprises a base supporting the first and second insulating plates, a horizontal positioning adjustment means for adjusting the horizontal position of the base in the direction intersecting with the carrying path, and a vertical positioning adjustment means for adjusting the vertical position of the base.

By this means, in addition to the function of adjustment of individual infrared heaters in horizontal and vertical positions, it is also possible to adjust the positioning of a group of infrared heaters simultaneously.

PREFERRED EMBODIMENTS OF THE INVENTION

The present invention is now described in terms of a preferred embodiment, with reference to the drawings.

FIGS. 1 to 4 show a preferred embodiment of the preform heating device of the present invention.

Figure 3:
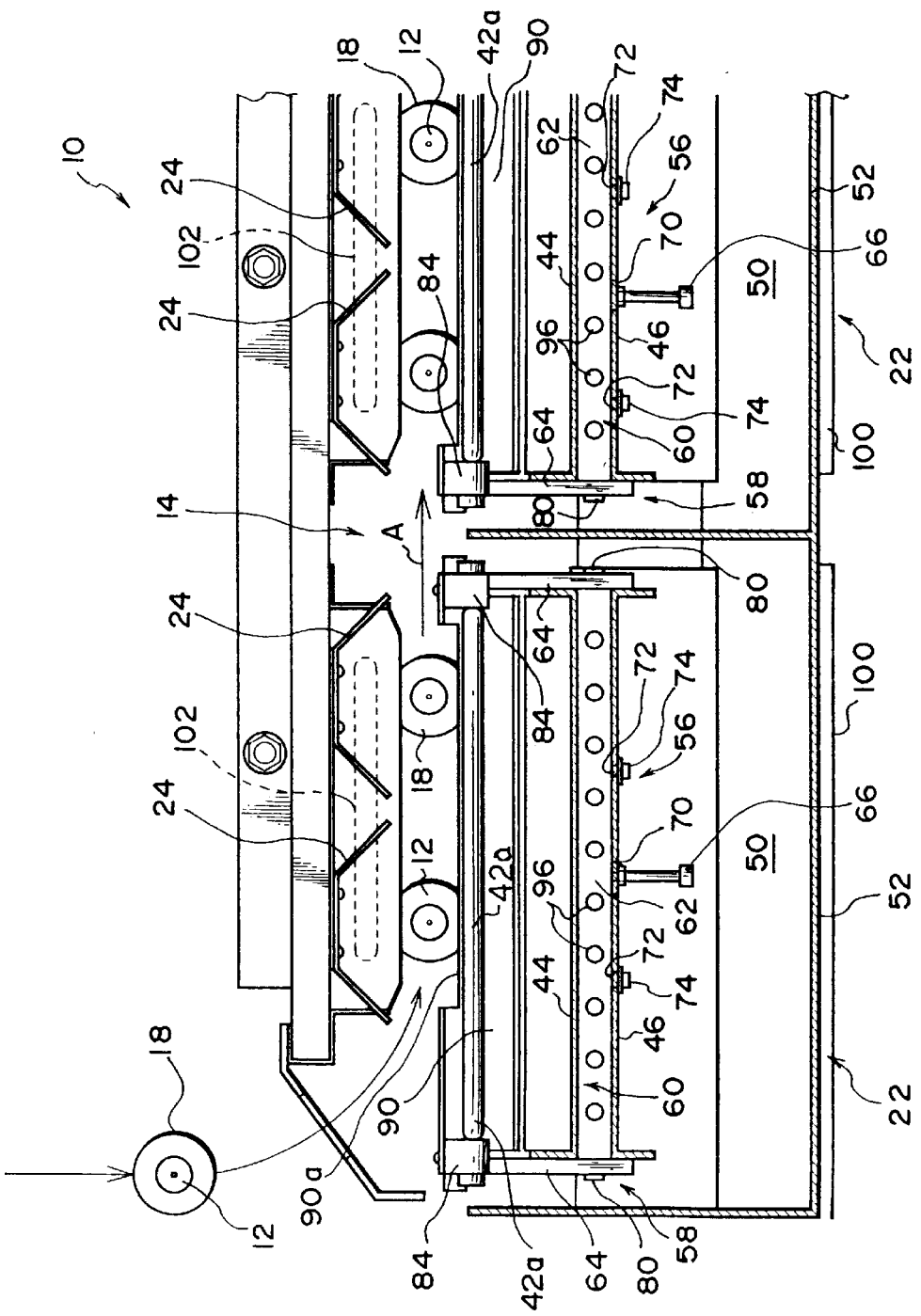
FIG. 3 is a sectional plan view of the heating box of FIG. 2.

This preform heating device 10 is disposed at an intermediate point of a carrying path 14 of preforms 12 (see FIG. 3).

Figure 1:
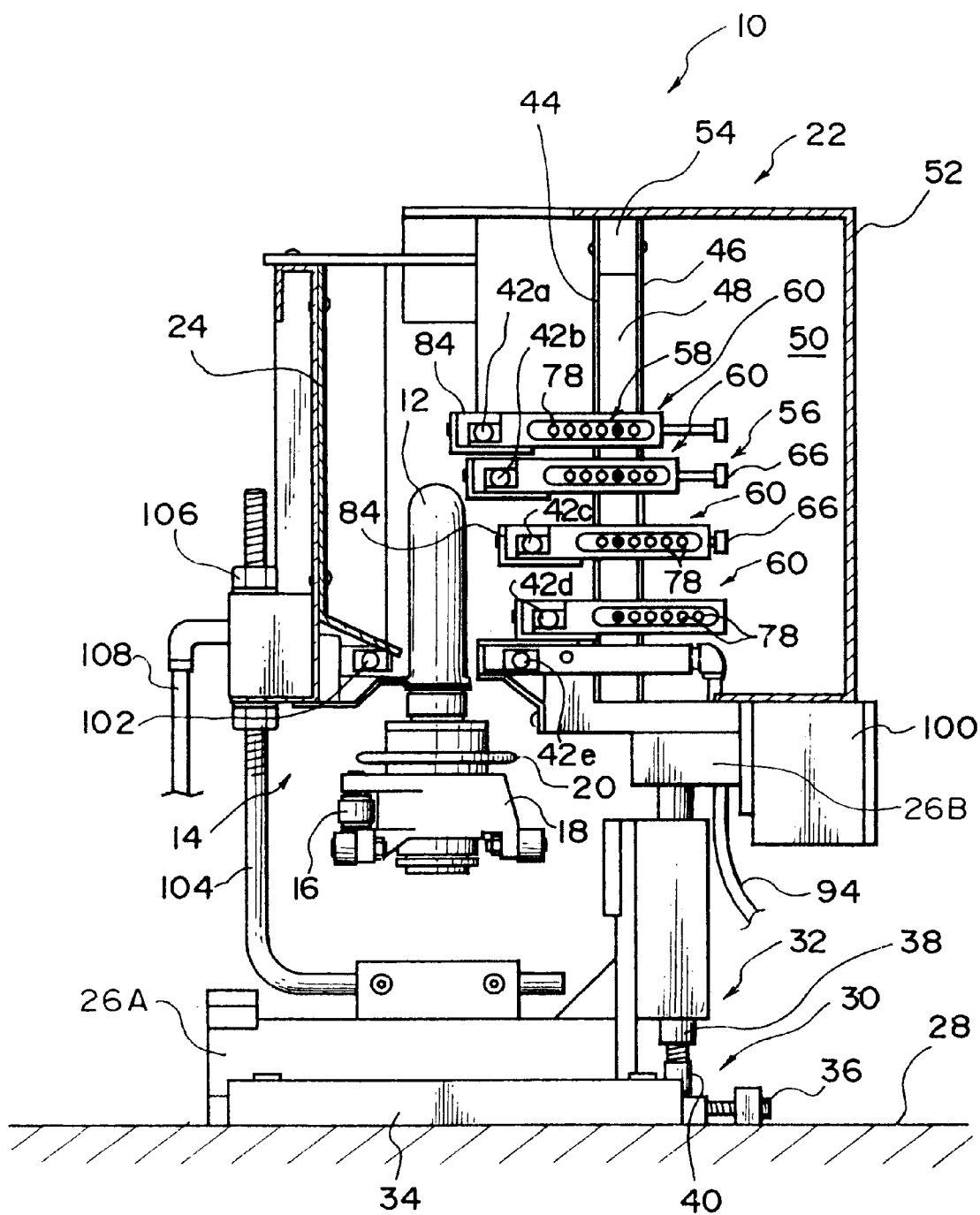
FIG. 1 is a sectional view of a preferred embodiment of the present invention.

In the carrying path 14 is disposed a carrying chain 16 shown in FIG. 1, and this carrying chain 16 has carrying members 18 fixed at given intervals therealong.

Preforms 12 are supported in the inverted state by the carrying members 18, and are intermittently carried along the carrying path 14 in the carrying direction A shown in FIG. 3, and are such as to be able to be stopped a plurality of times within the heating device 10.

A preform 12 stopped within the heating device 10 is rotated on the carrying member 18 by a rotation mechanism comprising a rotation sprocket 20 (see FIG. 1) meshing with a rotation chain not shown in the drawings, and is heated to a temperature appropriate to blow molding.

The heating device 10, as shown in FIGS. 1 and 33 is provided with heating boxes 22 and reflectors 24.

Figure 2:
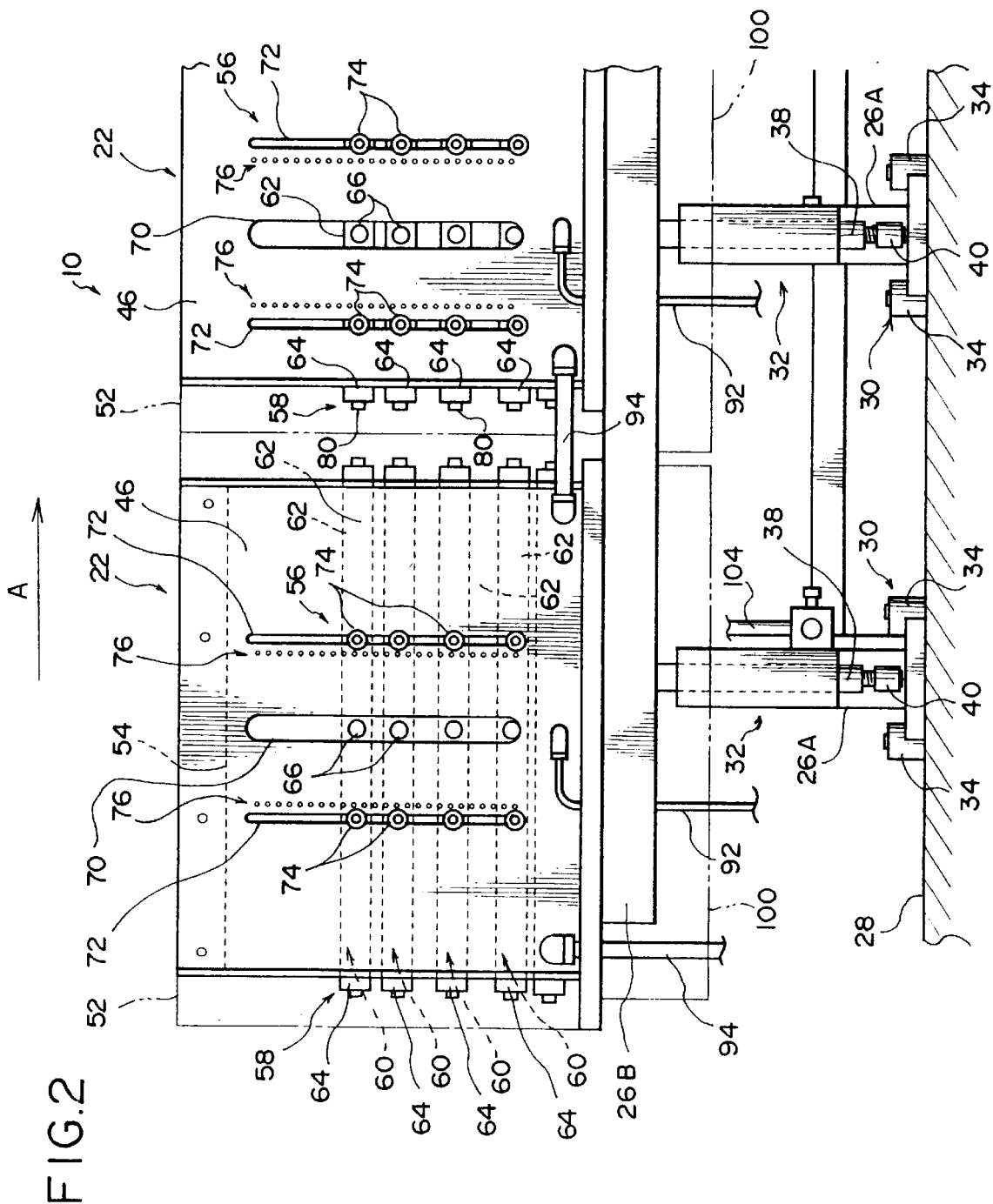
FIG. 2 is a substantially one-half background view of the interior with the cover removed from the heating box of FIG. 1.

Three of the heating boxes 22 are provided on one side of the carrying path 14 of the preforms 12 (two of the three are shown in FIG. 2), on a second heating box stand 26B, in turn supported by three first heating box stands 26A along the carrying path 14. These heating boxes 22 have one side open toward the carrying path 14, and have a cover 52 having an upper wall and three side walls.

The first heating box stands 26A, as shown in FIGS. 1 and 2, are horizontally adjustable on a base 28 in the direction intersecting with the carrying direction A by means of a horizontal positioning adjustment means 30, and with respect to the first heating box stands 26A, the second heating box stand 26B are vertically adjustable by means of a vertical positioning adjustment means 32. In this way, the heating boxes 22 are supported by means of the second heating box stand 26B so as to be adjustable in both the horizontal and vertical directions.

The horizontal positioning adjustment means 30 horizontally moves the first heating box stands 26A along a pair of rails 34 provided on the base 28, and the horizontal position (the position to the left or right as shown in FIG. 1) of the heating boxes 22 with respect to the preforms 12 is adjustable by a horizontal positioning adjustment screw 36.

The vertical positioning adjustment means 32 allows the height of pillars 38 supporting the second heating box stand 26B to be adjusted vertically with respect to the first heating box stands 26A.

Within the heating boxes 22, are disposed a number of, for example five, infrared heaters 42a, 42b, 42c, 42d, and 42e spaced apart in the axial direction of the preforms 12 and faced toward the carrying path 14 of the preforms 12.

The infrared heaters 42a, 42b, 42c, 42d, and 42e heat the preforms 12 by radiated heat, and are arranged so as to provide a temperature distribution along the axial direction of the preforms 12.

Here the preforms 12 are rotated during heating, so that heating is uniform in the circumferential direction.

Also within the heating boxes 22, as shown in FIG. 1, a first insulating plate 44 is disposed facing the carrying path 14 with the infrared heaters 42a, 42b, 42c, 42d, and 42e between, and in a position more remote from the infrared heaters 42a, 42b, 42c, 42d, and 42e than the first insulating plate 44 a second insulating plate 46 is disposed, and between these first and second insulating plates 44 and 46 is formed an insulating air layer 48.

The first and second insulating plates 44 and 46 are made of stainless steel.

The surface of the first insulating plate 44 facing the infrared heaters 42a, 42b, 42c, 42d, and 42e has a mirror finish, to reflect light from the infrared heaters 42a, 42b, 42c, 42d, and 42e for effective heating of the preforms 12, while by reducing the absorption of light by the first insulating plate 44 itself, renders the thermal insulation more effective.

It should be noted that the first and second insulating plates 44 and 46 are connected at their upper end by a connecting member 54.

Furthermore, a manipulation space 50 is disposed facing the insulating air layer 48 with the infrared heaters 42a, 42b, 42c, 42d, and 42e between. This manipulation space 50 is covered by a removable cover 52.

Of the five infrared heaters 42a, 42b, 42c, 42d, and 42e, the upper four infrared heaters 42a, 42b, 42c, and 42d can be adjusted the separation in both the vertical direction and in the horizontal direction with respect to the preforms 12 by means of a vertical adjustment means 56 and horizontal adjustment means 58, while the bottom infrared heater 42e is fixed to the heating box 22.

More specifically, the upper four infrared heaters 42a, 42b, 42c, and 42d, are each supported by the second insulating plate 46 by means of a support member 60. Since the support construction for each of the upper four infrared heaters 42a, 42b, 42c, and 42d is the same, the construction of the support mechanism for the infrared heater 42a is now described.

This support member 60 comprises a support rod (first support member) 62 disposed to extend over the whole width between the first and second insulating plates 44 and 46, and pair of support plates (a pair of second support members) 64 projecting from both ends of the support rod 62 toward the carrying path 14. The two ends of the infrared heater 42a are supported by the ends of the pair of support plates 64.

Figure 4:
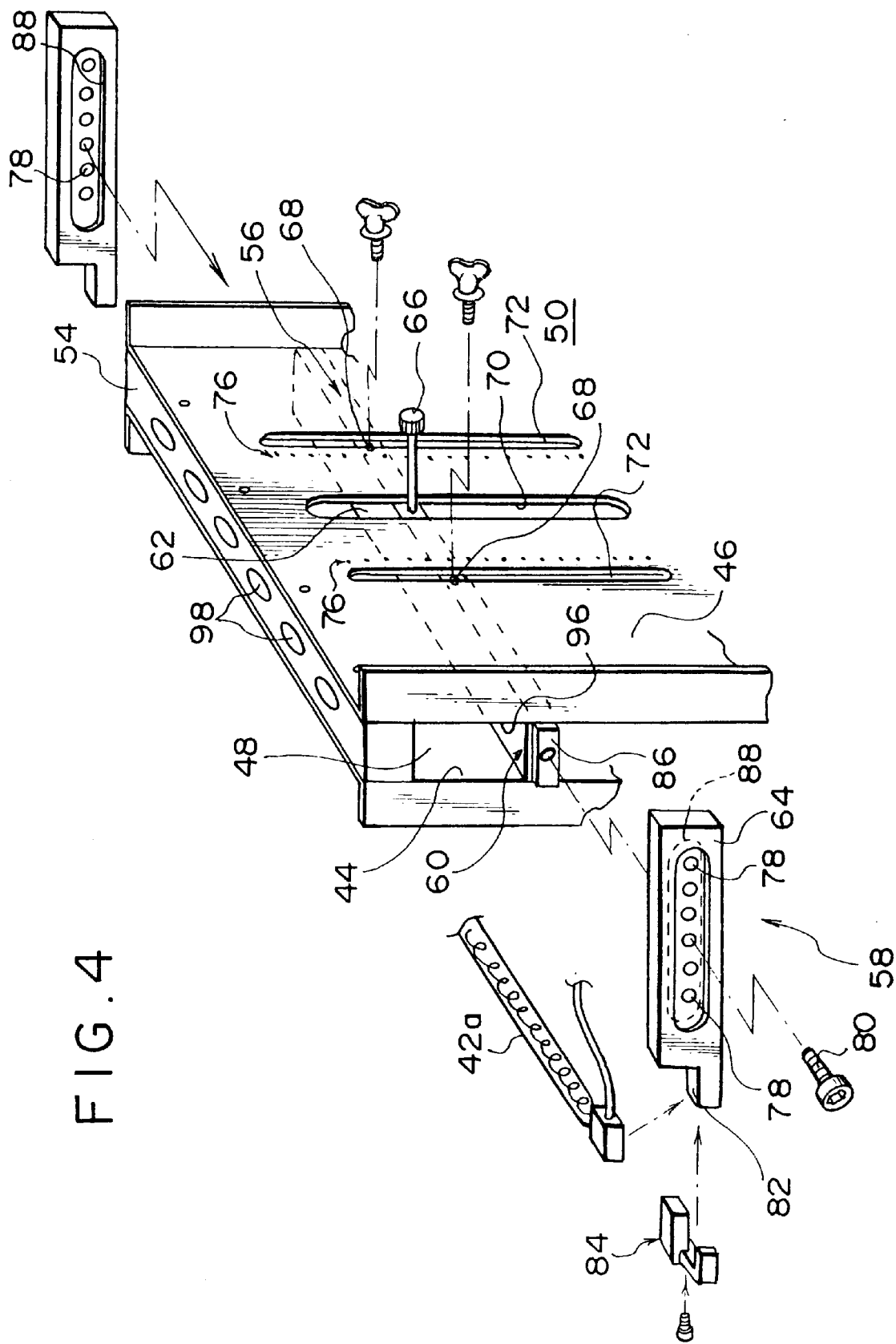
FIG. 4 is an exploded partial view showing first and second insulating plates and the manner of attachment of support elements.

The support rod 62, as shown in FIG. 4, has a handle 66 projecting horizontally at a substantially central position on the side opposite from the infrared heater 42a, and a pair of fixing holes 68 provided on either side of the handle 66.

The second insulating plate 46, as shown in FIGS. 2 and 4 has a vertically oriented first vertical slot 70 through which the handle 66 of the support rod 62 passes, and a pair of second vertical slots 72 provided in positions corresponding to the fixing holes 68, and this constitutes a part of the vertical adjustment means 56.

It should be noted that between the first insulating plate 44 and the support rod 62 a gap is provided so that the support rod 62 does not contact the first insulating plate 44.

This first vertical slot 70 and second vertical slots 72 have sufficient length that the four infrared heaters 42a, 42b, 42c, and 42d can be subjected to height adjustment.

Thus, by moving the handle 66 along the first vertical slot 70 in the vertical direction, and screwing bolts 74 being a fastening means passing through the pair of second vertical slots 72 into fixing holes 68 and fastening the same at a suitable height, the support rod 62 is fixedly supported in an appropriate vertical position, and the height of the infrared heater 42a can be adjusted.

When readjusting the height of the infrared heater 42a, it is easy to adjust by loosening the bolts 74 and moving the support rod 62 by means of the handle 66.

To ensure that the infrared heater 42a is maintained positively horizontal, as shown in FIGS. 2 and 4, beside the pair of second vertical slots 72 are provided a plurality of gauge holes 76 aligned along the second vertical slots 72, and the bolts 74 can be tightened using these gauge holes 76 as a reference.

If as shown in FIG. 4 the bolts 74 are bolts with handles, the handle 66 is not necessary.

The pair of support plates 64, as shown in FIG. 4, has a plurality of, for example six, fixing holes 78 as a horizontal adjustment means 58, at a given spacing in the horizontal direction.

Selecting one of the fixing holes 78, the support plates 64 are fixed with bolts 80 to the ends of the support rod 62, whereby the separation of the infrared heater 42a from the preforms 12 can be adjusted in the horizontal direction.

Also, as shown in FIG. 4, in the upper surface of the end of the each support plate 64 is formed a concave mounting portion 82 in which the end of the infrared heater 42a is mounted.

An end of the infrared heater 42a is mounted on the mounting portion 82, and by attaching a retaining plate 84 to the end of the support plate 64, the infrared heater 42a is prevented from falling.

The retaining plate 84 holds the infrared heater 42a with a certain degree of play, so that no torsion or other load is put on the infrared heater 42a when the fitting position or the height of the support plate 64 is adjusted, whereby damage to the infrared heater 42a is prevented.

Further, opposing surfaces of the support plates 64, as shown in FIG. 4, have an engaging groove 88 into which fits a projection 86 formed on the end of the support rod 62, extending over the range of formation of the plurality of fixing holes 78.

Furthermore, between the ends of a pair of support plates 64, as shown in FIG. 3, is fixed a reflector 90 which reflects the light of the infrared heater 42a toward the preforms 12 (see FIG. 3).

Therefore, since the engaging grooves 88 of the support plates 64 engage with the projections 86 of the support rod 62, and moreover the support plates 64 and reflector 90 are connected together, the engagement of the support plates 64 with the support rod 62 is maintained even if the support plates 64 are released from the state of being fixed to the support rod 62.

As a result, the support plates 64 are prevented from falling, and moving of the infrared heaters 42a, 42b, 42c, and 42d excessively toward the preforms 12 can be prevented.

The extremity 90a of the reflector 90 toward the preforms 12 is arranged to project further toward the preforms 12 than the infrared heater 42a. By this means, when the infrared heater 42a is adjusted, damage due to the infrared heater 42a impacting the preforms 12 is prevented.

In this way, the height of the infrared heater 42a can be adjusted by means of the vertical adjustment means 56 of simple construction, and height adjustments required by the size of the preforms 12 or the containers can be carried out, and moreover, the interval between the infrared heater 42a and the preforms 12 can be adjusted by means of the horizontal adjustment means 58. This adjustment operation can be carried out in the same way for the infrared heaters 42b, 42c, and 42d. In this way, by adjusting the vertical and horizontal positions of the infrared heaters 42b, 42c, and 42d, in addition to adjusting the voltage or electrical power of the infrared heaters 42a, 42b, 42c, and 42d, an optimum temperature distribution can be obtained.

Moreover, this adjustment operation can be carried out by removing the cover 52 of the heating boxes 22 in the manipulation space 50 insulated from the infrared heaters 42a, 42b, 42c, 42d, and 42e by the insulating air layer 48. For this reason, the operation can be carried out without being affected by the heat of the infrared heaters 42a, 42b, 42c, 42d, and 42e, and overheating of the vertical adjustment means 56 can be prevented by the insulating air layer 48.

In particular, after shutting off the supply of voltage to the infrared heaters 42a, 42b, 42c, 42d, and 42e, the vertical adjustment means 56 cools rapidly, and the operation can be begun relatively rapidly.

The lowest infrared heater 42e, which is fixed to the heating box 22 can have its position with respect to the preforms 12 adjusted by means of the horizontal positioning adjustment means 30 and the vertical positioning adjustment means 32.

The distance in the horizontal direction between the infrared heater 42e and the preforms 12 can be adjusted by loosening the rails 34 fixing the first heating box stand 26A to the base 28 and turning the horizontal positioning adjustment screw 36. Further, the height of the infrared heater 42e can be adjusted by turning height adjustment screws 40 at the lower end of the pillars 38.

Further, at the fixing portion of the infrared heater 42e at the bottom of the heating box 22, as shown in FIG. 2, are connected a compressed air pipe 92 connected to a supply of compressed air not shown in the drawings and serving as a compressed air supply means, and a cooling water pipe 94 connected to a supply of cooling water not shown in the drawings.

The compressed air pipe 92 and cooling water pipe 94 not only prevent overheating of the fixing portion of the lowest infrared heater 42e which is heated to the highest temperature, but also allow the surface of the preforms 12 to be cooled by compressed air from the compressed air pipe 92.

Further, the compressed air from the compressed air pipe 92 is also introduced in the insulating air layer 48 between the first and second insulating plates 44 and 46, to improve the insulation effect of the insulating air layer.

For this reason, as shown in FIGS. 3 and 4, a plurality of air holes 96 is formed to pass vertically through the support rod 62 disposed between the first and second insulating plates 44 and 46, and thus effective insulation is assured as air can pass through in the upward direction.

It should be noted that, as shown in FIG. 4, a plurality of air holes 98 is also formed in the connecting member 54 disposed between the top edges of the first and second insulating plates 44 and 46, allowing the air to pass.

Further, as shown in FIG. 1, in the lower part of the manipulation space 50 within the heating boxes 22 is provided a terminal board 100, and overheating of the terminal board 100 is prevented by the insulating air layer 48.

The reflectors 24 on the opposite side of the carrying path 14 from the heating boxes 22 are shaped so as to reflect light back toward the stationary preforms 12 (see FIG. 3). In this way, heating of the preforms 12 can be carried out efficiently in a short time from both sides of the carrying path 14 by means of light from the infrared heaters 42a, 42b, 42c, 42d and 42e and the reflected light thereof.

The reflectors 24, as shown in FIG. 1, are supported on a first heating box stand 26A by reflector pillars 104, and the reflector pillars 104 are movable with respect to the first heating box stands 26A. As a result, the distance between the reflectors 24 and the preforms 12 is adjustable. Moreover, by means of height adjustment nuts 106, the height of the reflectors 24 is adjustable.

It should be noted that at the bottom of these reflectors 24 also, as shown in FIGS. 1 and 3, opposing the infrared heater 42e an infrared heater 102 is provided, so that the portion of the preforms 12 corresponding to the shoulder portion of the containers can be adequately heated.

Further, at the fixing portion of the infrared heater 102, as shown in FIG. 1, is connected a cooling water pipe 108, and this fixing portion can be cooled.

The present invention is not limited to the above described embodiment, and a number of variant embodiments are possible within the scope of the present invention.

For example, the preforms are described as being carried intermittently, and stopping within the heating boxes, but if an adequate heating time can be obtained, there is no necessity for the preforms to be stopped.

Further, the support rod is provided with a handle substantially in a center position, with fixing holes provided on both sides thereof. A sliding groove and vertical slots are provided at positions of the second insulating plate corresponding to the handle and the fixing holes. However, these positions and numbers may be freely varied.

Furthermore, the fixing of the support rod may be provided by, in place of the vertical slots, a plurality of fixing holes spaced apart at a given interval in the vertical direction.

Further, for the first insulating plate may be used a ceramic or synthetic resin material providing a high thermal insulation effect.

Additionally, the number of heating boxes installed is not limited to the number given, and this may be arbitrarily varied according to the heating conditions.

What is claimed is:

1. A preform heating device comprising:
    a carrying path along which a preform is carried in a state that an axial direction thereof is vertical;
    infrared heaters disposed horizontally and spaced apart in said axial direction of said preform carried along said carrying path;
    a rotating means for rotating said preform;
    a first insulating plate disposed vertically, said first insulating plate and said carrying path being disposed facing each other with said infrared heaters between;
    a second insulating plate disposed more remotely from said infrared heaters than said first insulating plate;
    an insulating air layer formed between said first and second insulating plates;
    support members for supporting each of said infrared heaters; and
    a height adjustment means for allowing the height of said support members to be moved in the vertical direction with respect to said second insulating plate, and fixing said support members to said second insulating plate in a given vertical position.

2. The preform heating device according to claim 1, further comprising a heating box cover for covering the upper and lateral exposed sides of said first and second insulating plates and said height adjustment means but excluding the lateral side facing said carrying path.

3. The preform heating device according to claim 2, wherein said height adjustment means comprises:
    a first vertical slot formed in said second insulating plate; and
    handles projecting from said support members through said first vertical slot.

4. The preform heating device according to claim 3, wherein between said heating box cover and said second insulating plate is provided a manipulation space for a manipulation of said handles in the vertical direction.

5. The preform heating device according to claim 2, wherein said height adjustment means comprises:
    a second vertical slot formed in said second insulating plate; and
    fastening means for fastening said support members to said second insulating plate through said second vertical slot.

6. The preform heating device according to claim 5, wherein between said heating box cover and said second insulating plate is provided a manipulation space for a manipulation of said fastening means.

7. The preform heating device according to claim 1, wherein each of said support members comprises:
    a first support member disposed between said first and second insulating plates; and
    a pair of second support members projecting from each end of said first support members toward said carrying path, and mounting both ends of each of said infrared heaters on projecting extremities thereof.

8. The preform heating device according to claim 7, wherein:
    each of said pair of second support members has fixing holes formed spaced apart in the horizontal direction; and
    one of said fixing holes is selected to attach said pair of second support members to said first support member so that the respective distances between said preform and said infrared heaters can be adjusted.

9. The preform heating device according to claim 7, wherein each of said pair of second support members has an engaging groove engaging with each end of said first support members, and said engaging groove is formed to extend over the range of formation of said fixing holes.

10. The preform heating device according to claim 9, wherein between the extremities of said pair of second support members is attached a reflector for reflecting light from each of said infrared heaters toward said preform.

11. The preform heating device according to claim 10, wherein said reflector is formed so as to project closer to said preform than each of said infrared heaters.

12. The preform heating device according to claim 7, further comprising a compressed air supply means for supplying compressed air toward between said first and second insulating plates, and
    wherein each of said first support members has a through hole allowing said compressed air to pass.

13. The preform heating device according to claim 1, further comprising:
    a base supporting said first and second insulating plates;
    a horizontal positioning adjustment means for adjusting the horizontal position of said base in a direction intersecting with said carrying path; and
    a vertical positioning adjustment means for adjusting the vertical position of said base.

* * * * *